(12) United States Patent
Gupta et al.

(10) Patent No.: US 12,003,832 B2
(45) Date of Patent: Jun. 4, 2024

(54) SYSTEMS AND METHODS FOR GENERATING INTERACTIVE 360-DEGREE CONTENT

(71) Applicant: Rovi Guides, Inc., San Jose, CA (US)

(72) Inventors: Vikram Makam Gupta, Karnataka (IN); Vishwas Sharadanagar Panchaksharaiah, Karnataka (IN)

(73) Assignee: Rovi Guides, Inc., San Jose, CA (US)

( * ) Notice: Subject to any disclaimer, the term of this patent is extended or adjusted under 35 U.S.C. 154(b) by 95 days.

(21) Appl. No.: 17/242,031

(22) Filed: Apr. 27, 2021

(65) Prior Publication Data

US 2022/0345793 A1 Oct. 27, 2022

(51) Int. Cl.
| | | |
|---|---|---|
| *H04N 21/8545* | (2011.01) | |
| *G06F 3/01* | (2006.01) | |
| *G06T 19/00* | (2011.01) | |
| *G06T 19/20* | (2011.01) | |
| *H04N 21/45* | (2011.01) | |
| *H04N 21/81* | (2011.01) | |

(52) U.S. Cl.
CPC ......... *H04N 21/8545* (2013.01); *G06F 3/011* (2013.01); *G06T 19/006* (2013.01); *G06T 19/20* (2013.01); *H04N 21/4532* (2013.01); *H04N 21/8146* (2013.01); *G06T 2219/2024* (2013.01)

(58) Field of Classification Search
CPC ........... H04N 21/8545; H04N 21/4532; H04N 21/8146; G06T 19/006; G06T 19/20; G06T 2219/2024; G06F 3/011
See application file for complete search history.

(56) References Cited

U.S. PATENT DOCUMENTS

| | | | |
|---|---|---|---|
| 2016/0300388 A1* | 10/2016 | Stafford | A63F 13/69 |
| 2018/0315248 A1* | 11/2018 | Bastov | G06F 3/04815 |
| 2019/0198057 A1* | 6/2019 | Cheung | G06F 16/783 |
| 2022/0327608 A1* | 10/2022 | Assouline | G06Q 30/0643 |

\* cited by examiner

*Primary Examiner* — Oschta I Montoya
(74) *Attorney, Agent, or Firm* — Haley Guiliano LLP

(57) ABSTRACT

Systems and methods for identifying certain objects within 360-degree content for user interaction. Objects within 360-degree content may be identified, and the corresponding segments of 360-degree content may be assigned a score according to how likely they may be to meet certain criteria, such as the likelihood that the user may interact with the object or its segment. Scores may be assigned in any manner, such as with reference to retrieved user information. In highly scored segments, users may be encouraged to pause the content at that segment, and interact with its objects. Encouragement may take any form, such as highlighting the segment or some component thereof. Likewise, interaction may also take any form, such as the allowing the user to alter the appearance of one or more segment objects in some way. In this manner, increased user interaction with 360-degree video is allowed, increasing viewer interest and engagement.

20 Claims, 6 Drawing Sheets

SYSTEMS AND METHODS FOR GENERATING INTERACTIVE 360-DEGREE CONTENT

BACKGROUND

Embodiments of the disclosure are directed generally to systems and methods for managing presentation of content. Embodiments of the disclosure are directed more specifically to systems and methods for generating interactive 360-degree content.

SUMMARY

Immersive visual technologies have been developed to envelop users in an at least partially virtual environment. Such technologies, which can be referred to as extended reality technologies, include virtual reality (VR), augmented reality (AR), and mixed reality (MR) technologies. VR systems immerse users in a fully digital or virtual environment, typically employing a headset or head-mounted display to present users with a 360-degree view of a completely virtual or simulated environment, sometimes referred to as a virtual world. In contrast, AR systems overlay virtual information and objects on a view of the physical world, also typically via a head-mounted display, to enhance the real world. Somewhat related to AR systems, MR or hybrid reality systems overlay virtual objects on a view of the real world, where users may interact with these virtual objects in similar manner to physical objects in the real world, e.g., by "touching" them to open them up, move them, or the like.

Extended reality technologies suffer from drawbacks, however. For example, some extended reality systems, such as YouTube®, currently do not allow much if any interaction with published 360-degree content, reducing user engagement.

Accordingly, to overcome the limited ability of computer-based extended reality systems to allow user interaction, systems and methods are described herein for a computer-based process that provides users increased capability to interact with 360-degree content. In an illustrative example, certain objects in a particular segment of 360-degree content may be selected and made capable of interactions such as changes in visual presentation. Objects may be selected for interaction in any manner, such as by selection of objects for which the user or viewer has previously expressed a preference.

In some embodiments of the disclosure, objects in a particular segment of 360-degree content may be automatically identified and the segment may be assigned a score. Segment scores may be determined by comparison to one or more user preferences, so that extended reality systems may select, and make interactive, segments or objects that will be of interest to the user. For example, extended reality systems of embodiments of the disclosure may recognize users with an expressed preference for art. The systems may accordingly identify, and assign high scores to, segments having a number of objects such as paintings or sculptures. Segments with sufficiently high associated scores may then be designated as interactive, and made capable of user interaction. Systems may then present users the option to interact with one or more portions of the 360-degree content segment that may be associated with the highly scored objects. For instance, systems may allow these users to draw their own art upon or nearby the identified paintings or sculptures, allowing art-loving users to practice their own art upon or adjacent to existing works.

User preferences may be any preferences or other user information determined and stored in any manner. For example, relevant user preferences may be portions of a stored user profile that is retrieved and parsed to determine objects that are potentially of interest to the user. Scores may then be determined in any manner with reference to these user preferences. Highest scores may be given segments with identified objects that match objects listed as preferred within the retrieved user information.

Object identification may be performed in any manner. As one example, systems of embodiments of the disclosure may employ one or more machine learning models or other methods to identify any characteristic shape that may be used to identify an object. For instance, one or more machine learning models may be used to identify one or more planes within the 360-degree content. These planes may be selected by themselves, e.g., when they are walls or other objects the user may be interested in interacting with. As an alternative, the shapes and orientations of the planes may be used to identify one or more objects, e.g., planes of a vehicle which may be used to identify the vehicle itself. Objects identified from their planes may, as above, be selected for interactivity as desired.

Once made interactive, these objects may be generated for display along with their accompanying 360-degree content in a typical manner. In some embodiments of the disclosure, a reference may also be displayed accompanying the object in the 360-degree content. For example, the system may display one or more indicators to the user informing the viewer about the interactive object. Any indicator may be employed, such as text instructions to the user indicating the presence of the object, its location, and/or instructions for interacting with the object. Other indicators may include, without limitation, arrows or other visual indicators pointing out the interactive object, an audible reference to the object, a highlighting of the object or its surroundings such as a border drawn around the object or its room, shading of the object or its surroundings, or any other method of directing a viewer's attention to an object in 360-degree content.

The reference or indicator may further include messages to or information for the viewer, such as an option to interact with the interactive object. As an example, the reference may include text- or voice-based instructions informing the user of permitted ways to interact with the interactive object, and allowing the user to choose his or her preferred way. Options may also be presented to pause the 360-degree content, to select the object for some form of interaction, or the like.

Viewers may then select the object and manipulate it in any manner allowed by the 360-degree content system. For instance, the system may allow the user to draw or write on the object using a virtual pen or other implement, affix another object to the interactive object, or may allow any other manner of changing or altering the interactive object's visual presentation. If desired, the system may then store the interactive object's modified appearance for further display.

BRIEF DESCRIPTION OF THE FIGURES

The above and other objects and advantages of the disclosure will be apparent upon consideration of the following detailed description, taken in conjunction with the accompanying drawings, in which like reference characters refer to like parts throughout, and in which.

DETAILED DESCRIPTION

In one embodiment, the disclosure relates to systems and methods for identifying certain objects within 360-degree content for user interaction. Objects within 360-degree content may be identified, and the corresponding segments of 360-degree content may be assigned a score according to how likely they may be to meet certain criteria, such as the likelihood or possibility that the user may interact with the object or its segment. Scores may be assigned in any manner, such as with reference to retrieved user information that indicates preferences of the user for the segment or any of its objects. In highly scored segments, users are encouraged to pause the 360-degree content within that segment and interact with the objects of the segment. Encouragement may take any form, such as highlighting the segment or some component thereof such as identified objects within that are deemed to be of likely interest to the user. Likewise, interaction may also take any form, such as allowing the user to alter the appearance of one or more segment objects in some way. In this manner, increased user interaction with 360-degree video is allowed, increasing viewer interest and engagement.

Figure 1:
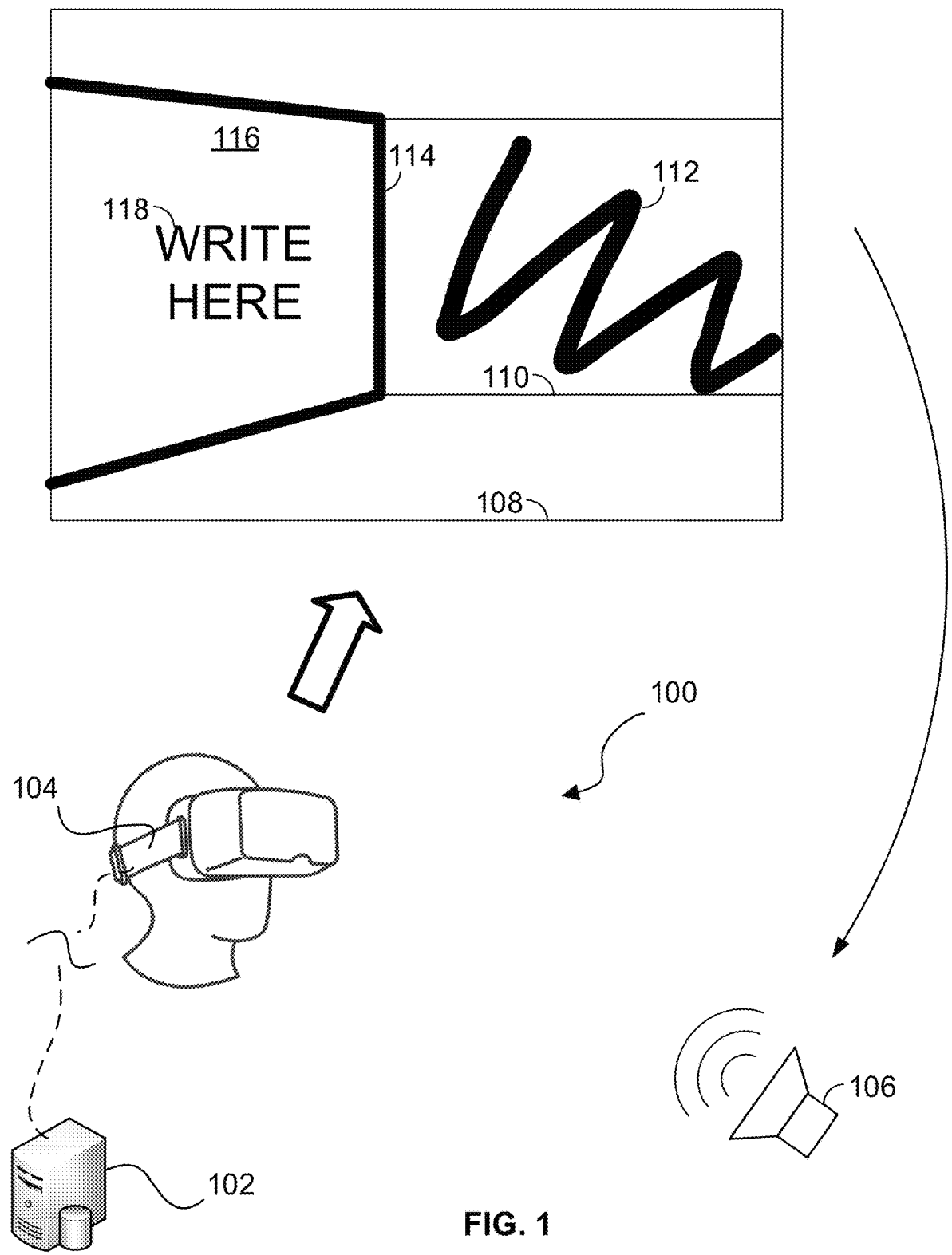
FIG. 1 conceptually illustrates operation of an exemplary system for generating interactive 360-degree content, in accordance with embodiments of the disclosure.

FIG. 1 conceptually illustrates operation of an exemplary system for generating interactive 360-degree content, in accordance with embodiments of the disclosure. Here, a 360-degree content display system 100 includes a server 102 or other computer, in electronic communication with a head-mounted display 104. Server 102 generates one or more elements of a virtual environment and transmits these elements for display by head-mounted display 104 to the user. In particular, head-mounted display 104 projects images to generate a generally three-dimensional environment 108 for immersing the user within. In particular, the user's view of environment 108 changes as the user moves his or her head, simulating the physical world. The environment 108 may be a projection of 360-degree content, and may include portions of the physical world, or may be a completely virtual environment, depending on whether the system 100 is a VR, MR, or AR system. Each system 100 may also include a speaker 106 in electronic communication with its respective server 102 for transmitting sounds uttered by another user. In similar manner, each system 100 may include a microphone (not shown) in electronic communication with server 102 and configured for detecting and relaying user sounds to each other user. The microphone and/or speaker 106 may be incorporated into head-mounted display 104, or may alternatively be stand-alone devices positioned within audible range of head-mounted display 104.

The environment 108 may include one or more objects of any nature, such as a wall 110 upon which markings 112 are positioned. Markings 112 may be captured within the original content when it was generated, e.g., may be markings existing on an actual physical wall when it was filmed or captured as 360-degree content, or may be virtual markings generated by previous user interaction. Environment 108 may also include indicators intended to convey information to the viewer. Such indicators may take any form, such as a highlighting border 114 emphasizing a particular object, in this case a wall 116, for viewer interaction. Indicators may also optionally include a text-based message such as message 118 instructing the viewer or offering him or her the option to interact in some manner that may be specified in the message 118 itself. Here, for example, the message 118 may inform the user that he or she may write, such as by a virtual pen or other instrument, upon the wall 116, creating virtual graffiti or other markings similar to markings 112. Indicators may also highlight an entire segment, such as by highlighting the entire room containing walls 110 and 116, by presenting text-based messages near that room to be seen when the user approaches, or the like. Embodiments of the disclosure contemplate any indicator that may inform users of one or more potential interactions in any manner. As another example, indicators may include an audible message broadcast to the user over speaker 106.

Figure 2:
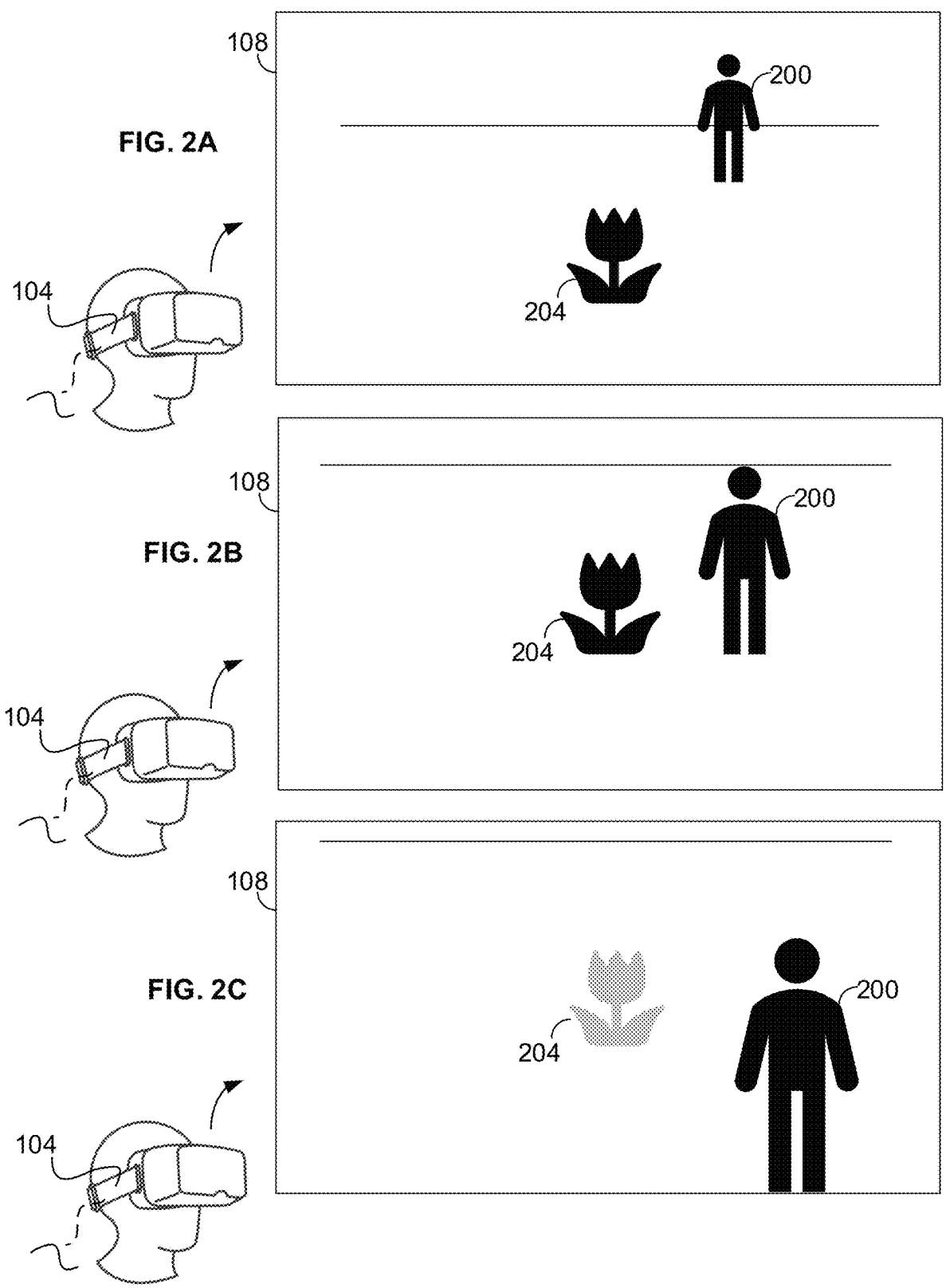
FIGS. 2A-2C conceptually illustrate further details of operation of an exemplary system for generating interactive 360-degree content, in accordance with embodiments of the disclosure.

FIGS. 2A-2C conceptually illustrate further details of operation of an exemplary system for generating interactive 360-degree content, in accordance with embodiments of the disclosure. In this example, an object such as a flower 204 is selected within a segment of 360-degree content as being of potential interest to a viewer, as represented by avatar 200. The viewer, via head-mounted display 104, perceives environment 108 and manipulates his or her avatar 200 within. In particular, the viewer may move toward (FIGS. 2A and 2B), and interact with (FIG. 2C), flower 204.

In some embodiments of the disclosure, the viewer may be permitted the option to interact with flower 204 in specified ways, such as by altering its appearance or visual representation in some manner. Here, for example, the viewer may be given the option to select flower 204 and change its color or shading, such as by "painting" it with a virtual brush, pen, or spray can, or by simply selecting one or more different colors or shades. In the example of FIG. 2C, the viewer may elect to change the color of flower 204 to a lighter color, whereupon his or her avatar 200 may be moved on to interact with other objects, and the color(s) of flower 204 may remain in their newly altered state or may revert back to their original color(s) after some time, as desired. Any user interactions, carried out in any manner, are contemplated by various embodiments of the disclosure.

Figure 3:
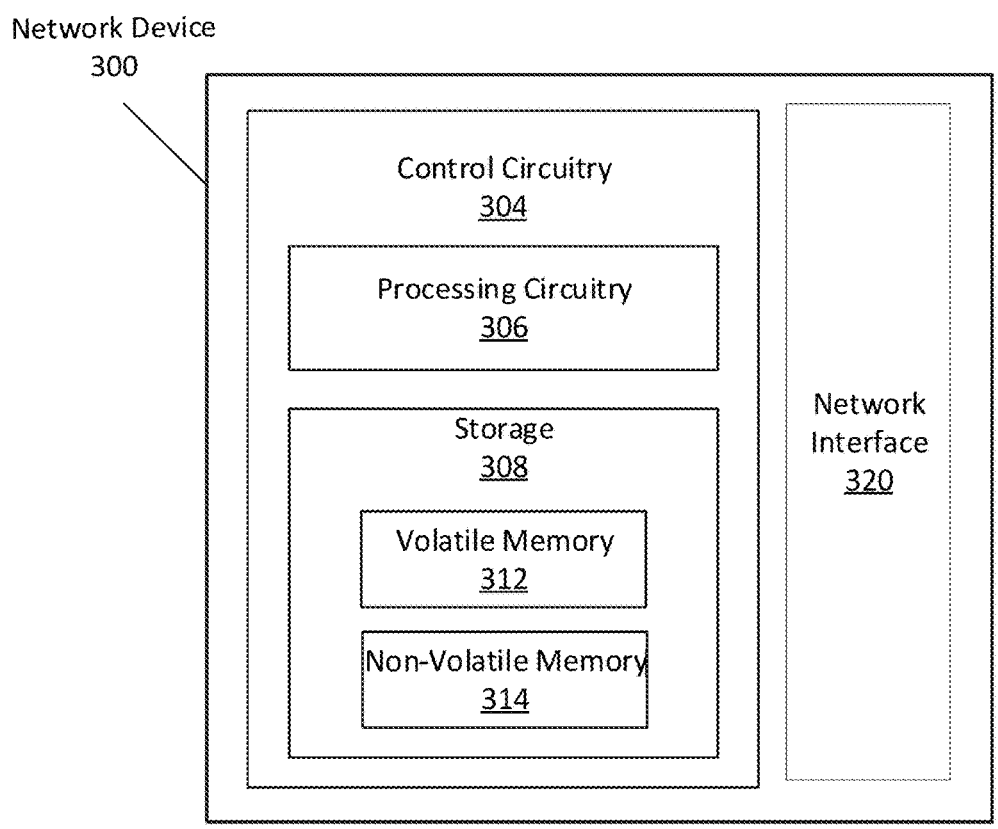
FIG. 3 is a block diagram of an illustrative device in a system for generating interactive 360-degree content, in accordance with embodiments of the disclosure.

FIG. 3 shows an illustrative block diagram of a device 300 in an extended reality system, according to some embodiments of the disclosure. Device 300 in an extended reality system may include one or more servers (e.g., server 102 of FIG. 1) for generating, displaying, and/or managing an extended reality environment, including managing identification of and interaction with objects in 360-degree content, transmitted over a computer network to end-user multi-perspective devices (e.g., devices 104 of FIGS. 1 and 2A-C). Control circuitry 304 may be based on any suitable processing circuitry such as processing circuitry 306. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer.

In some embodiments, processing circuitry 306 may be distributed across multiple separate processors or processing units, for example, multiple of the same type of processing units (e.g., two Intel Core i7 processors) or multiple different processors (e.g., an Intel Core i5 processor and an Intel Core i7 processor). A network interface 320 may be used to communicate with other devices in a network system (e.g., between devices 104 and across internet 410 of FIG. 4).

In some embodiments, control circuitry 304 executes instructions for execution of extended reality content generation and/or processing functions stored in memory (i.e., storage 308). The instructions may be stored in either a non-volatile memory 314 and/or a volatile memory 312 and loaded into processing circuitry 606 at the time of execution. A system for generating and processing extended reality content (e.g., the systems described in reference to FIGS. 1-2C) may be a stand-alone application implemented on a user device (e.g., end-user device 104) and/or a server (e.g., device 400) or distributed across multiple devices in accordance with device 300. The system may be implemented as software or a set of executable instructions. The instructions for performing any of the embodiments discussed herein of extended reality processing may be encoded on non-transitory computer-readable media (e.g., a hard drive, random-access memory on a DRAM integrated circuit, read-only memory on a BLU-RAY disk, etc.) or transitory computer-readable media (e.g., propagating signals carrying data and/or instructions). For example, instructions in accordance with the processes described herein may be stored in storage 308, and executed by control circuitry 304 of device 300.

Control circuitry 304 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be included. Control circuitry 304 may also include scaler circuitry for upconverting and downconverting content into the preferred output format of the end-user devices 104. Circuitry 304 may also include digital-to-analog converter circuitry and analog-to-digital converter circuitry for converting between digital and analog signals. The tuning and encoding circuitry may be used to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, functions for incorporating video or other recordings of physical environments, multiple-tuner recording, etc.). If storage 308 is provided as a separate device from device 300, the tuning and encoding circuitry (including multiple tuners) may be associated with storage 308. Device 300 may be a central device in communication with each device 104. Alternatively, device 300 may correspond to device 104, that is, each system 100 may not have its own device 104, but rather a single central device 300 may carry out extended reality environment generation and audio conflict resolution processes for every system 100.

Figure 4:
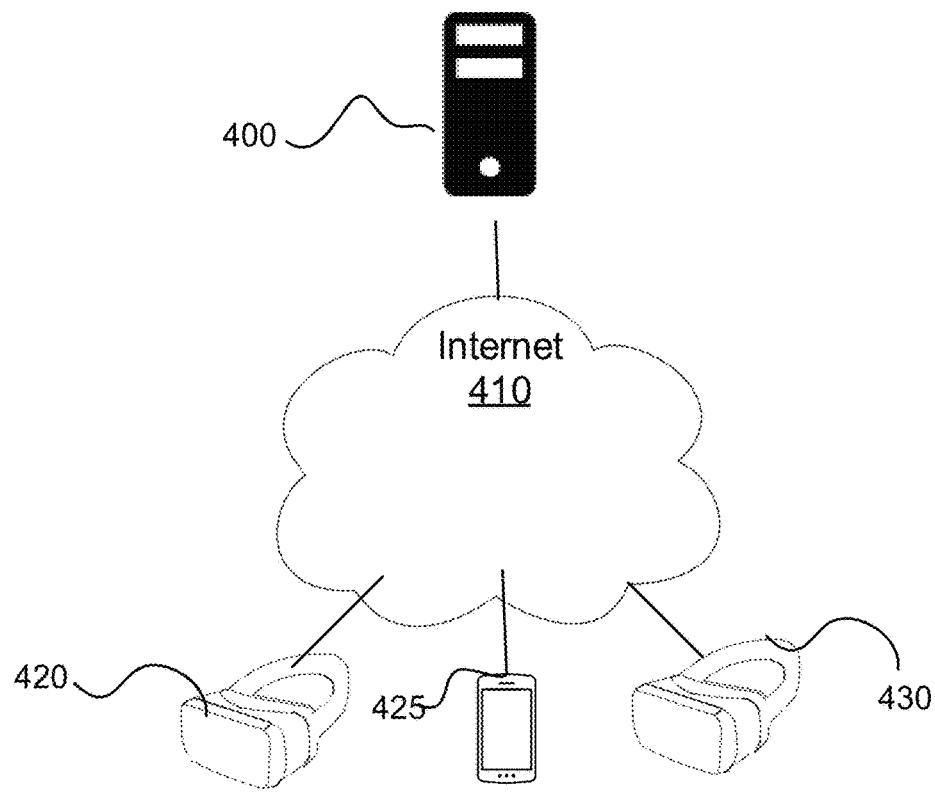
FIG. 4 is a block diagram of an illustrative system for generating interactive 360-degree content, in accordance with embodiments of the disclosure.

FIG. 4 shows an illustrative block diagram of an extended reality content system according to some embodiments of the disclosure. At least one extended reality content server 400 generates extended reality content, such as that described herein. Extended reality content server 400 transmits the content over internet 410 to multiple end-user devices including devices 420, 425, 530. End-user extended reality devices may include, for example, personal computers, mobile devices (e.g., smart phones), and/or wearable devices including extended reality headsets, goggles, suits, gloves, etc., configured to present and allow interaction with extended reality environments. These devices are configured to allow an operator/user to view and interact with multi-user extended reality content. These devices may provide, for example, visual, audio, and haptic feedback that present the perspectives and attention-directing cues such as described herein. End-user devices 420, 425, 430 also transmit data to server 400 via internet 410, where such data includes orientation information indicating the direction the devices 420, 425, 30 are facing (and thus the view that server 400 must generate for display on each device 420, 425, 430), audio signals detected by each device 420, 425, 530, and user input such as selections of extended reality objects. Server 400 then generates a view of the extended reality environment for each device 420, 425, 430.

Figure 5:
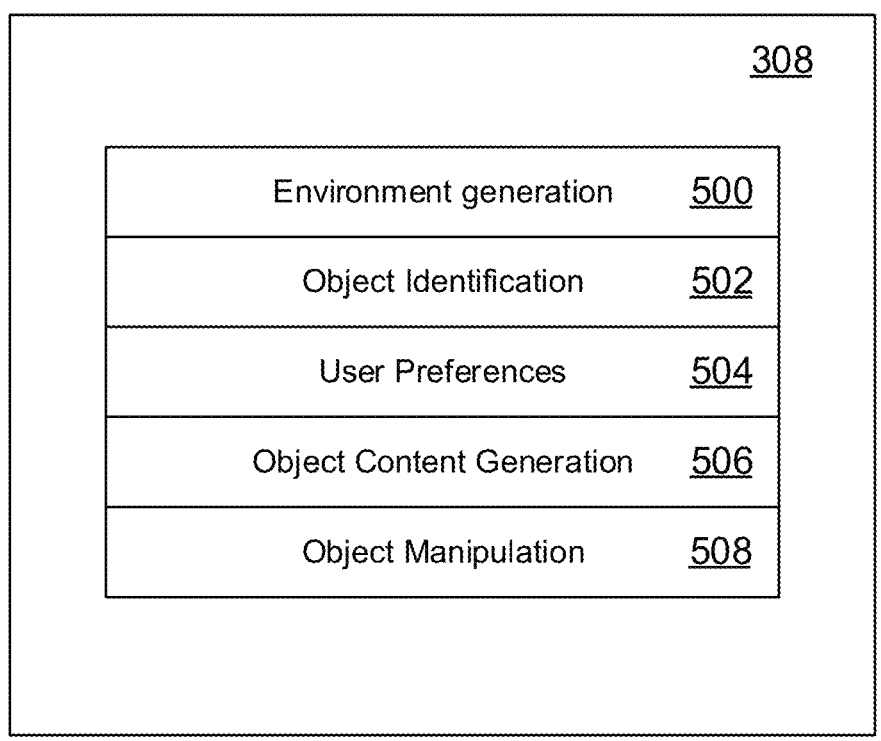
FIG. 5 is a block diagram of instruction modules stored in the storage of the device of FIG. 3, in accordance with embodiments of the disclosure.

FIG. 5 is a block diagram of instruction modules stored in the storage of the device of FIG. 3, in accordance with embodiments of the disclosure. The instructions stored in storage 308 may include any number of instruction or code modules for executing processes of embodiments of the disclosure. In some embodiments, the instruction modules include an environment generation module 500 for generating the extended reality environment transmitted to and displayed by each device 420, 425, 430, as well as an object identification module 502 for identifying objects within segments of content such as 360-degree content. The instruction modules also include a user preferences module 504 for storing and/or retrieving user information used to determine objects that may be of interest to the user, as well as an object content generation module 506 for altering the 360-degree content according to defined user interactions with selected objects, e.g., as described above in connection with FIGS. 2A-2C. The instruction modules further include an object manipulation module 508 implementing various mechanisms by which users may be allowed to manipulate objects, e.g., mechanisms for user alteration of object appearances, and the like.

Figure 6:
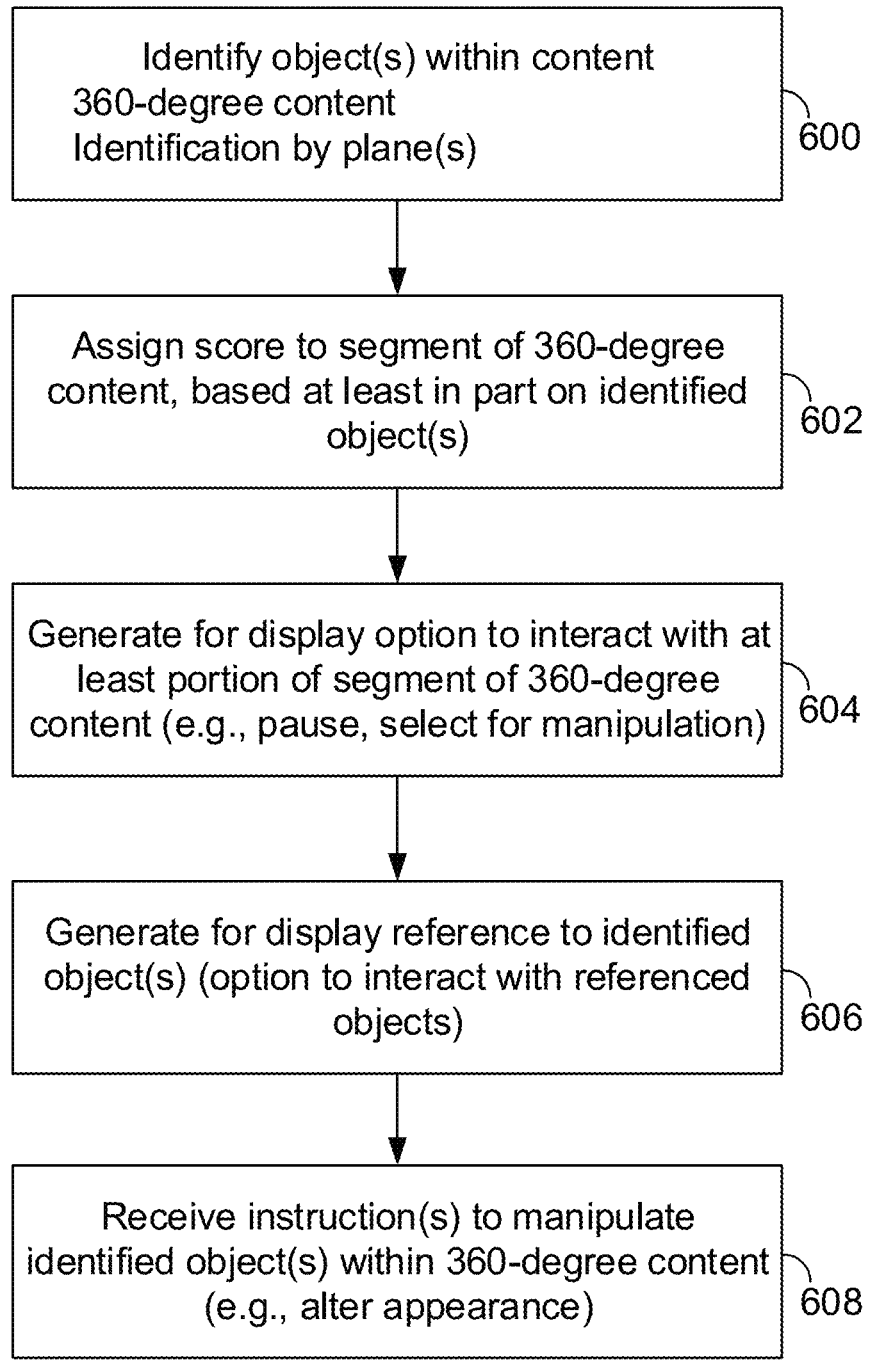
FIG. 6 is an illustrative flowchart of a process for identifying objects and making such objects interactive, in accordance with embodiments of the disclosure.

FIG. 6 is an illustrative flowchart of a process for identifying objects and making such objects interactive, in accordance with embodiments of the disclosure. Initially, environment generation module 500 may generate content such as 360-degree content for display upon various devices like head-mounted display 104. Object identification module 502 may also identify objects within segments of this content (Step 600), such as the currently displayed segment or one or more segments that may be displayed. Objects may be identified in any manner, such as by machine learning-based object identification implementing one or more machine learning models. These models may include a model such as a convolutional neural network model trained to visually identify objects. More specifically, a convolutional neural network model may be configured to receive images of objects as input, and to output likelihoods of object types or classes to which the object may belong. In particular, object identification module 502 may simply input the image representing the user's perceived field of view to machine learning models it implements, or may retrieve and input images of objects that have been previously tagged within the 360-degree content and associated with the content as, e.g., metadata. These machine learning models may be any one or more machine learning models encoded as any sets of instructions stored within, and implemented, by, object identification module 502.

The machine learning models of some embodiments of the disclosure may be configured to identify objects in any manner, such as by training on sets of labeled images of objects from 360-degree or other similar content. Alternatively, the machine learning models of some embodiments of the disclosure may be configured to identify planes within content, such as by classification into various flat surfaces or collections of flat surfaces such as walls, ceilings, floors, rooms, buildings, or the like. Identification via planes may be accomplished by, e.g., a first convolutional neural network or other machine learning model trained to identify planes, followed by a second convolutional neural network or other machine learning model trained to identify object types or classes from collections of planes output by the first model. The first model may be trained using, for example, labeled sets of images of planar and non-planar surfaces of various shapes and orientations. The second model may be trained using, for example, labeled sets of images of planar surfaces or groupings thereof.

In some embodiments of the disclosure, objects within 360-degree content may be identified at any time prior to their display. As one example, server 400 may identify and label objects within stored 360-degree content, with certain labeled objects triggering interactive routines allowing users to interact with these objects or their 360-degree content segments in a predetermined manner.

Once objects are identified within the displayed 360-degree content, server 400 may assign scores to the corresponding content segments (Step 602). A score may be assigned to a particular segment of content based at least in part on its identified objects, with reference to a retrieved set of user preferences or other user information. In some embodiments of the disclosure, one or more user preferences or sets of user information may be retrieved from, or by, user preferences module 504. This user information may then be parsed to identify categories or items for which the user may have previously expressed interest. As an example, user information may include lists of content the user has previously viewed and their corresponding genres, or survey questions the user has previously answered, each of which may indicate his or her preferred content types. User preferences module 504 may store associations between content types or categories and specific objects or object classes. For example, module 504 may store associations between content genres and particular objects, such as between the action genre and commonly employed objects therein, such as weapons, sports equipment, and the like. Segment scores may be incremented for each such object that is identified. That is, the segment score is increased for each object identified in Step 600 that the user has expressed a preference for, i.e., that is an object associated with one of the preferred genres of the retrieved user information.

If the score of a segment is greater than some predetermined threshold value, the system 100 may generate for display to the viewer an option to interact with at least a portion of that segment of 360-degree content (Step 604). The option to interact may take any form, and may be any option to interact with the 360-degree content in any manner. As one example, the system 100 may present the viewer an option to pause the 360-degree content, and/or remain within or enter the highly scored segment, so that the user may interact with some portion of the segment of 360-degree content or any of the identified objects therein. For example, users may be given the option to pause the 360-degree content at the segment in question, to further view or interact with it. This may, for instance, allow users to pause progress through the 360-degree content at a particular segment such as a room of an art gallery, and browse through that particular room before continuing on through the remaining rooms of the gallery. Some embodiments of the disclosure thus allow for identification of 360-degree content segments that may be of particular interest to the viewer, such as rooms containing a number of objects he or she may likely have an interest in, so that the viewer may pause at that segment to further interact therewith.

Embodiments of the disclosure contemplate any other options as well. Such options may include options to select various objects within the segment for manipulation. For instance, system 100 may generate, for display to the viewer, a reference to any identified objects (Step 606). As one example, objects may be highlighted, bordered, shaded, or the like for the viewer to interact with, as shown by the highlighting 114 of FIG. 1. As another example, system 100 may generate an icon or other graphic, such as an arrow pointing to an identified object with which the viewer is encouraged to interact. Alternatively, or in addition, system 100 may present to viewers any text or audible message containing any identification of any objects, or any option to interact with any such objects. Viewers may then select any option, or perform any corresponding actions within the 360-degree content.

Viewers may then interact with highlighted segments of 360-degree content or any objects within. Accordingly, users may pause their progress and further explore the highlighted segment of 360-degree content. As a further example, system 100 may allow users the option to interact more actively with segments of 360-degree content. In some embodiments of the disclosure, object manipulation module 508 may provide users the option to alter the outward appearance of portions of 360-degree content segments. Any manner of alteration is contemplated. For instance, system 100 may provide users a virtual spray paint can or paint brush, and allow these users to "paint" surfaces of the segment of 360-degree content by, e.g., applying a predefined texture. As another example, system 100 may provide users a virtual weapon or other manipulable object, and allow these users to wield these objects against surfaces of the content segment. A texture simulating damage or impact may then be applied to corresponding segment surfaces. Applied textures may be a permanent alteration of the 360-degree content, such as by overwriting those portions of the 360-degree content with the new textures via object content generation module 506, or may be temporary, such as by flushing or otherwise not retaining the new textures after some period of time, after the viewer leaves the segment of 360-degree content, or the like. As a further example, users may be permitted the option of generating and/or placing other objects upon identified portions of a content segment, e.g., generating their own virtual painting using various textures, and hanging their painting on the wall of a room in the 360-degree content. Any user manipulation of 360-degree content, using any objects, user-generated or otherwise, is contemplated.

Accordingly, users may interact with content segments or any objects therein, transmitting commands to the system 100 to alter the appearances of various surfaces as desired by the user. These commands may then be received by the system 100 (Step 608), where they prompt the system 100 to alter or manipulate the appearance of the appropriate objects within particular content segments.

Figure 7:
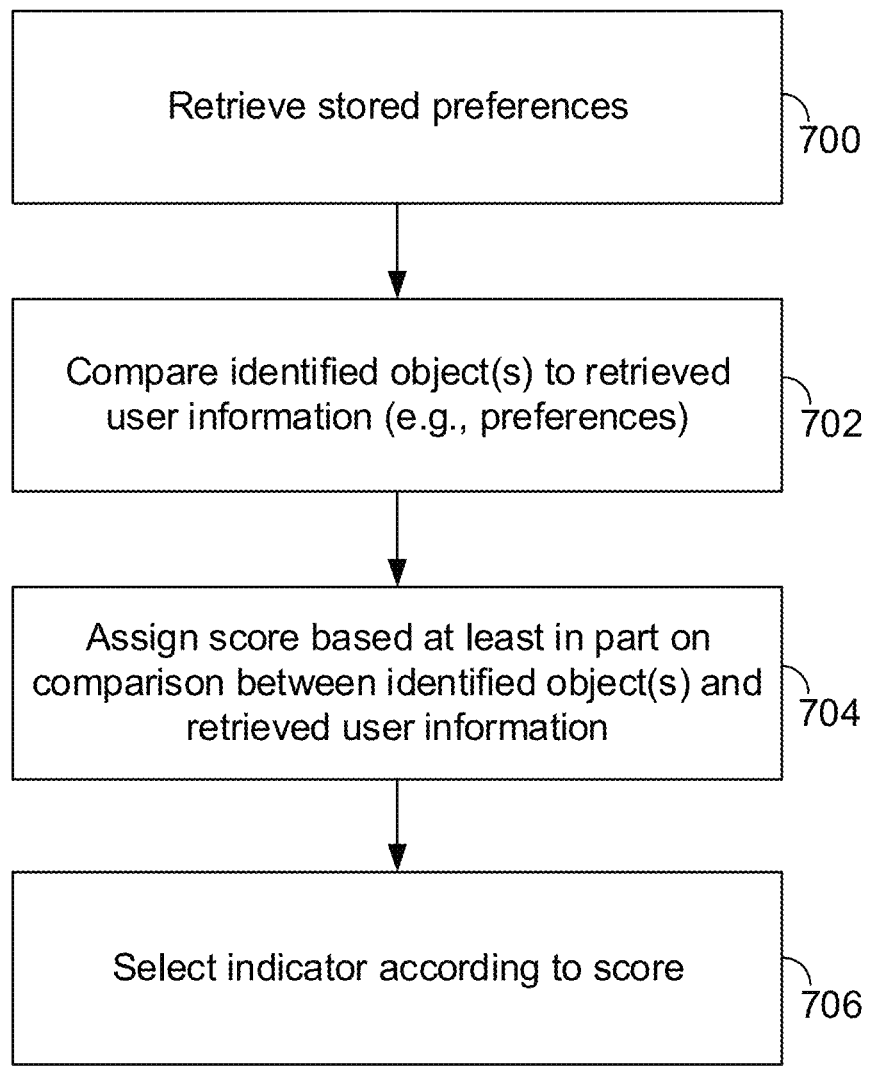
FIG. 7 is an illustrative flowchart of a more detailed process for identifying objects for interaction, in accordance with embodiments of the disclosure.

FIG. 7 is an illustrative flowchart of a more detailed process for identifying objects for interaction, in accordance with embodiments of the disclosure. As above, system 100 may identify objects in any manner within segments of 360-degree content, and assign a score to those segments at least partially according to their identified objects. In some embodiments of the disclosure, scores are assigned to segments according to how well their identified objects align with user preferences. System 100 may retrieve one or more user preferences stored in user preferences 504 (Step 700), and compare the objects identified within that segment to the retrieved user preferences (Step 702). As above, retrieved user preferences may be parsed to select any information that may indicate preferred objects, such as preferred content genres, past items or objects ordered or used, survey results indicating preferred objects or object types, or the like.

This information may then be used to determine objects the user may have an interest in. More specifically, this information may be applied to assign a score to the segment of content based at least in part on a comparison between the identified objects of the segment, and the retrieved user preferences or other information (Step 704). For instance, one or more rules may be retrieved to associate identified objects with preferred content types or categories, e.g., identified paintings or sculptures with art-related content. If any rules associate identified objects with any of the user preferences, the content may be assigned a higher score. Scores may be assigned or tallied in any manner, such as by assigning each identified object a zero score initially, and incrementing the score by a predetermined amount for each user preference that it is associated with. Greater score increments may be assigned for identified objects that match object categories for which the user has an expressed preference. That is, particularly preferred objects or object categories, as expressed in any manner within user information, may result in larger assigned score increments. Any other manner of computing a segment score based on its identified objects and a set of user information is contemplated.

System 100 may then select an indicator for display to the viewer, where the indicator may be selected according to the segment score assigned in Step 704 (Step 706). Any indicators are contemplated for display, selected in any manner according to any criteria. For example, an indicator may be selected for display with a segment of 360-degree content if the segment score exceeds a predetermined threshold value (which may be any value). Alternatively, or in addition, different indicators may be selected according to segment score. More specifically, predetermined lower ranges of segment scores may result in selection of certain indicators, while predetermined higher ranges of segment scores may result in selection of other indicators. As an example, segment scores above a first, lower predetermined value may result in highlighting of the segment or its contents, e.g., highlight 114, while segment scores above a second, higher predetermined value may result in a more noticeable indicator such as a highlight along with an additional text-based or audible message encouraging the user to further inspect the content segment. Embodiments of the disclosure contemplate any methods for selecting any one or more indicators according to assigned segment score.

The foregoing description, for purposes of explanation, used specific nomenclature to provide a thorough understanding of the disclosure. However, it will be apparent to one skilled in the art that the specific details are not required to practice the methods and systems of the disclosure. Thus, the foregoing descriptions of specific embodiments of the present invention are presented for purposes of illustration and description. They are not intended to be exhaustive or to limit the invention to the precise forms disclosed. Many modifications and variations are possible in view of the above teachings. For example, objects within 360-degree content may be identified in any manner, and scores may be assigned to corresponding content segments in any manner. Likewise, any one or more indicators may be selected according to assigned segment scores in any way, and any resulting viewer manipulation of or interaction with the segment is contemplated. The embodiments were chosen and described in order to best explain the principles of the invention and its practical applications, to thereby enable others skilled in the art to best utilize the methods and systems of the disclosure and various embodiments with various modifications as are suited to the particular use contemplated. Additionally, different features of the various embodiments, disclosed or otherwise, can be mixed and matched or otherwise combined so as to create further embodiments contemplated by the disclosure.

What is claimed is:

1. A method of selecting objects for interaction in 360-degree content, the method comprising:
    using control circuitry, identifying one or more concurrently displayed objects within a segment of 360-degree content;
    retrieving user information, wherein the user information comprises one or more user preferences;
    comparing the one or more concurrently displayed identified objects to the retrieved user information;
    assigning a respective score to each of the one or more concurrently displayed identified objects within the segment of 360-degree content based on the comparing; and
    based at least in part on the respective assigned score to each of the one or more concurrently displayed identified objects, generating for display an option to interact with at least a portion of the segment of 360-degree content, wherein the generating comprises:
        modifying a first subset of the one or more concurrently displayed identified objects, whose respective score exceeds a threshold value, to be user-modifiable via a user interface (UI) input; and
        refraining from modifying a second subset of the one or more concurrently displayed identified objects, whose respective score is less than the threshold value, such that the second subset of the one or more identified objects is not user-modifiable via the UI input.

2. The method of claim 1, wherein:
    the generating for display the option to interact with at least the portion of the segment of 360-degree content is based on the respective assigned score to each of the one or more concurrently displayed identified objects exceeding the threshold value.

3. The method of claim 1, further comprising designating at least one of the one or more concurrently displayed identified objects as an interactive object.

4. The method of claim 1, wherein the identifying further comprises identifying one or more planes within the 360- degree content, and identifying the one or more concurrently displayed objects at least in part according to the one or more identified planes.

5. The method of claim 1, further comprising generating for display a reference to at least one of the one or more concurrently displayed identified objects.

6. The method of claim 5, wherein the option to interact further comprises an option to interact with the referenced one or more concurrently displayed identified objects.

7. The method of claim 1, wherein the generating further comprises generating for display one or more of an option to pause the 360-degree content, or an option to select one or more of the concurrently displayed identified objects for manipulation.

8. The method of claim 1, further comprising receiving one or more instructions to manipulate at least one of the one or more concurrently displayed identified objects within the 360-degree content.

9. The method of claim 8, wherein the one or more instructions further comprise instructions to alter an appearance of at least one of the one or more concurrently displayed identified objects within the 360-degree content.

10. The method of claim 1, wherein the respective assigned score is used to select the one or more concurrently displayed identified objects that are of interest to a user by comparing attributes corresponding to the concurrently displayed identified objects to the retrieved user information, wherein the retrieved user information includes a preferred content genre, past items or objects purchased or used and survey results indicating preferred object types.

11. The method of claim 1, wherein the user-modifiable first subset of the one or more concurrently displayed identified objects and the second subset of the one or more identified objects that is not user-modifiable remain visible within the segment of 360-degree content.

12. A system for selecting objects for interaction in 360-degree content, the system comprising:
a storage device; and
control circuitry configured to:
identify one or more concurrently displayed objects within a segment of 360-degree content;
retrieve user information, wherein the user information comprises one or more user preferences;
compare the one or more concurrently displayed identified objects to the retrieved user information;
assign a respective score to each of the one or more concurrently displayed identified objects within the segment of 360-degree content based on the comparing; and
based at least in part on the respective assigned score to each of the one or more concurrently displayed identified objects, generate for display an option to interact with at least a portion of the segment of 360-degree content, wherein the generating comprises modifying a first subset of the one or more concurrently displayed identified objects, whose respective score exceeds a threshold value, to be user-modifiable via a user interface (UI) input, and refraining from modifying a second subset of the one or more concurrently displayed identified objects, whose respective score is less than the threshold value, such that the second subset of the one or more identified objects is not user-modifiable via the UI input.

13. The system of claim 12, wherein:
the generating for display the option to interact with at least the portion of the segment of 360-degree content is based on the respective assigned score to each of the one or more concurrently displayed identified objects exceeding the threshold value.

14. The system of claim 12, wherein the control circuitry is further configured to designate at least one of the one or more concurrently displayed identified objects as an interactive object.

15. The system of claim 12, wherein the identifying further comprises identifying one or more planes within the 360-degree content, and identifying the one or more concurrently displayed objects at least in part according to the one or more identified planes.

16. The system of claim 12, wherein the generating further comprises generating for display one or more of an option to pause the 360-degree content, or an option to select one or more of the concurrently displayed identified objects for manipulation.

17. The system of claim 12, wherein the control circuitry is further configured to receive one or more instructions to manipulate at least one of the one or more concurrently displayed identified objects within the 360-degree content.

18. The system of claim 17, wherein the one or more instructions further comprise instructions to alter an appearance of at least one of the one or more concurrently displayed identified objects within the 360-degree content.

19. The system of claim 12, wherein the respective assigned score is used to select the one or more concurrently displayed identified objects that are of interest to a user by comparing attributes corresponding to the concurrently displayed identified objects to the retrieved user information, wherein the retrieved user information includes a preferred content genre, past items or objects purchased or used and survey results indicating preferred object types.

20. The system of claim of claim 12, wherein the user-modifiable first subset of the one or more concurrently displayed identified objects and the second subset of the one or more identified objects that is not user-modifiable remain visible within the segment of 360-degree content.

* * * * *